F. W. DAVIS.
CIGAR CUTTER.
APPLICATION FILED MAR. 3, 1915.
1,186,291.
Patented June 6, 1916.
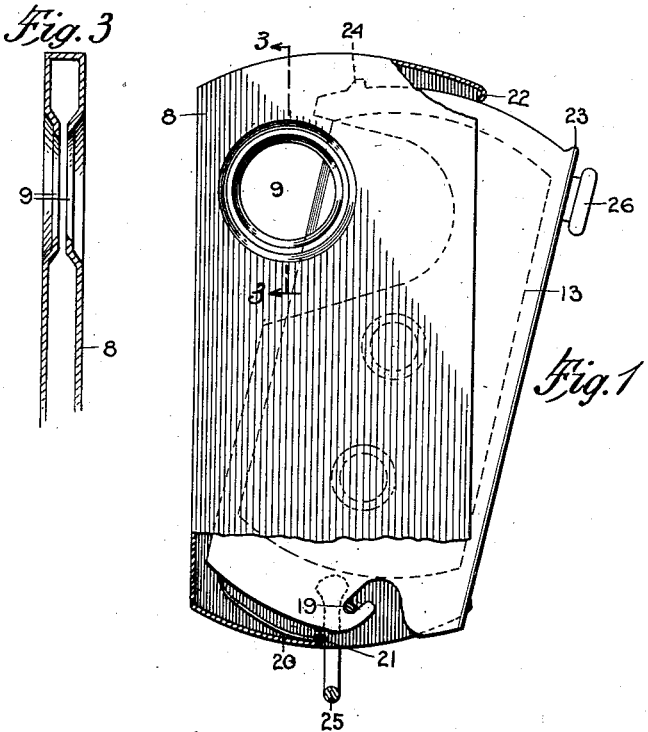
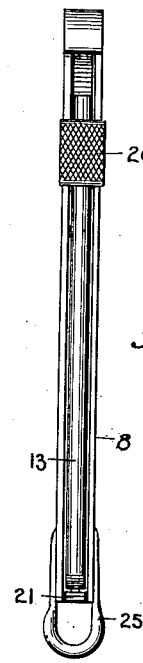
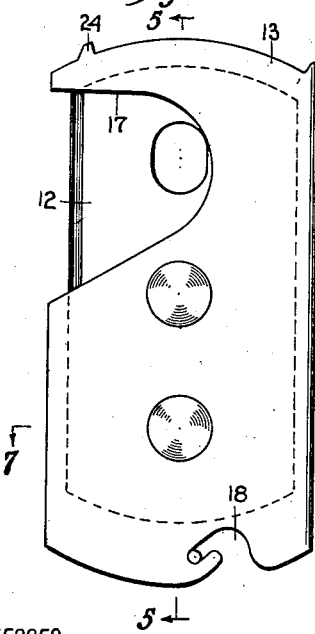
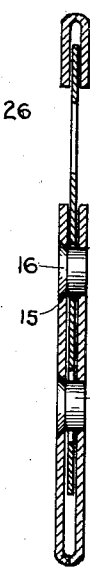
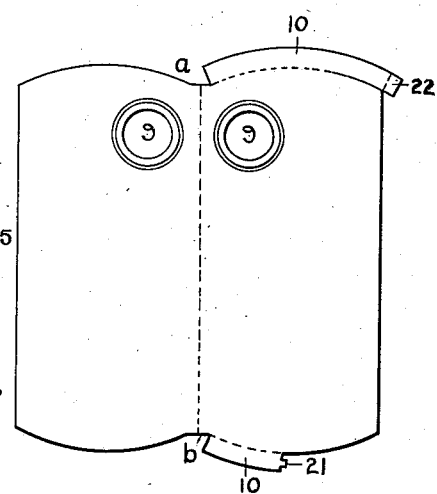
WITNESSES
INVENTOR
Francis W. Davis
BY
ATTORNEYS

UNITED STATES PATENT OFFICE.

FRANCIS WRIGHT DAVIS, OF BUFFALO, NEW YORK.

CIGAR-CUTTER.

1,186,291.  Specification of Letters Patent.  Patented June 6, 1916.

Application filed March 3, 1915. Serial No. 11,656.

*To all whom it may concern:*

Be it known that I, FRANCIS W. DAVIS, a citizen of the United States, and a resident of Buffalo, in the county of Erie and State of New York, have invented a new and Improved Cigar-Cutter, of which the following is a full, clear, and exact description.

My invention relates to cigar cutters characterized by a removable cutting blade mounted to swing between a pair of plates, with means for locking said blade between the plates.

An object of the invention is to provide a simple, convenient and inexpensive cigar cutter the removable cutting blade of which has four cutting lengths easily interchangeable, whereby a sharp edge can always be provided in the cigar cutter.

A further object of the invention is to provide a cigar cutter in which the cutting blade can be easily and quickly interchanged and the parts constituting the cigar cutter can be easily cleaned.

With the above and other objects in view, the nature of which will more fully appear as the description proceeds, the invention consists in the novel construction, combination and arrangement of parts as herein fully described, illustrated and claimed.

In the accompanying drawings, forming part of the application, similar characters of reference indicate corresponding parts in all the views, and Figure 1 is a front elevation of my cigar cutter certain parts of which are cut away to show the details of construction; Fig. 2 is a side elevation of the device; Fig. 3 is a vertical section on line 3—3, Fig. 1; Fig. 4 is an elevation of the blade carrier; Fig. 5 is a vertical section on line 5—5, Fig. 4; Fig. 6 is a plan view of the blank forming casing of the cigar cutter; and Fig. 7 is a horizontal section on line 7—7, Fig. 4.

The objections generally cited against the present type of cigar cutters are that while the cutting edges may be sharp when new, they soon become dull through continued use, with no means of substituting a new blade or cutting edge; and there is no simple way of sharpening the original blade. Furthermore, under the action of tobacco the steel blades have a tendency to rust; consequently, the present type of cigar cutters with permanent blades are unsanitary, as it is not an easy matter to clean them.

My invention has for its object the overcoming of the above objections and is designed to use interchangeable blades, and preferably multiple cutting edge blades are utilized such as used in safety razors for example Gillette blades. The cost of the blades is negligible, for the reason that every one who uses safety razors has a number of blades which have passed their usefulness for the razor. The utilization of the multiple cutting edge blades for my cigar cutter renders the same very economical and furnishes an available application for an article which has had no further value.

Referring to the drawing, 8 represents the casing of the cigar cutter which is formed of a blank, as shown in Fig. 6. A blank of suitable thickness is stamped to form the depressed openings 9 adapted to register when the blank is doubled along the central dotted line *a—b*. The ends 10 and 11 are bent at right angles and sweated in this position, to properly space the facing walls of the blank. The distance between the depressed openings 9 is just wide enough to let a double cutting edge blade pass therebetween.

The carrier 13 for the blade is made from sheet metal stamping, which is doubled along its length in a way similar to what has been described in the making of the casing 8. The ends of the blank forming the carrier are sweated together to space the facing walls sufficiently to admit the blade 12 through the side edge opening 14 left by the doubling of the blank forming the carrier. The facing walls of the carrier are provided with registering openings 15 adapted to aline with the central and one of the end openings of the blade when a blade is placed into the carrier. The blade is maintained within the carrier by pins 16 engaging the openings 15 of the carrier. A part of the side walls of the carrier at the open edge 14 is cut away, as shown at 17. This cut-away in the carrier exposes half of the cutting edge of the blade and constitutes one of the cutting lengths of my cigar cutter; and in view of the fact that only half of the length of the cutting edge is used, each blade will give four cutting lengths.

The carrier 13, at the edge remote from the cut-out 17, is provided with a hook-shaped cut-out portion 18 adapted to engage a pin 19 provided in the casing 8 adjacent its lower edge, and which pin constitutes the pivot for the carrier 13. Secured to a projection 21 with one end thereof is a flat spring 20, the other end of which engages the lower end of the carrier 13. The fulcrum for the spring 20 is formed at the projection 21 bent interiorly from the end portion 10 of the casing blank (see Fig. 6). The tendency of the spring, as it will be seen, is to clear the recessed opening 9 for admitting a cigar. The end of the blank has also a projection 22 bent inwardly after the blank is formed, as shown in Fig. 1, which constitutes a catch adapted to engage a projection 23 formed at the upper closed corner of the carrier 13 and maintaining the carrier 13 locked within the casing 8. The upper edge of the carrier is provided with a second projection 24 adjacent the corner at the open side and adapted to resist a complete disengagement between the casing and the blade carrier; but when a sufficient pull is applied to the carrier 13 the projection 24 can be forced past the catch 22, thus completely disengaging the carrier from the casing, whereby the cutting length of the blade 12 can be interchanged. To facilitate the relative displacement between the carrier and casing, the carrier 13 is provided with a thumb pad 26 sweated to the closed side of the carrier, as best seen in Figs. 1, 2 and 4. The casing 8, adjacent its lower end, is provided with a loop 25 for attaching the cutter to a pocket chain or any other suitable carrying medium.

From the above description it will be seen that each blade has four separate and distinct cutting lengths. When a blade has become dull or rusted, it can be quickly replaced by separating the carrier from the casing as has been described. Blades for renewal can be universally obtained at practically no cost. Further, the structure of the cutter is such that the same is sanitary, as it can be easily cleaned and provided with a clean blade.

From the foregoing description, taken in connection with the accompanying drawings, the advantage of the construction and operation of the device shown will be readily understood by those skilled in the art to which the invention pertains; and while I have described the principle of operation, together with the device which I now consider to be the best embodiment thereof, I desire to have it understood that the device shown is merely illustrative and that such changes may be made as are within the scope of the appended claims.

Having thus described my invention, I claim as new and desire to secure by Letters Patent:

1. In a cigar cutter, a casing having an open side, a blade-carrier engaging said casing through the open side, means detachably connecting said carrier to said casing adjacent the lower edge of the casing and carrier, whereby said carrier is mounted to swing within the casing, said carrier having an open side adapted to admit a cutting blade having two cutting edges, said carrier and blade having openings adapted to register, pins for engaging said openings in the carrier and blade whereby the blade is removably attached to said carrier, said carrier having a cut-out at the open side adapted to expose a predetermined length of one of the cutting edges of the blade, said casing having registering openings adapted to coöperate with the cut-out portion of the carrier, and a spring normally tending to swing the carrier out of the casing, said casing and carrier having means adapted to lock the carrier to the casing.

2. In a cigar cutter, a casing having an open side, a blade carrier engaging said casing through the open side, said carrier having a hook shaped cut-out adjacent the lower edge, a pin in said casing adapted to be engaged by said cut-out of the carrier whereby the same is detachably secured to said casing and mounted to swing therein, said carrier having an open side edge, a cutting blade adapted to fit into the carrier through said edge, the sides of said carrier and blades having openings adapted to register, removable pins engaging the carrier and blade, said casing having registering openings in the sides thereof, and a spring associated with the casing and engaging the lower edge of the carrier and normally tending to swing the carrier out of the casing, said carrier having a portion of its sides cut out at its open-side edge and adjacent the upper edge, whereby a portion of the blade within the carrier is exposed, said casing having parts of the side thereof about the registering opening depressed inwardly and for which the cut-out in the carrier forms a clearance to permit the swinging of the carrier within the casing, said carrier and casing having means for locking them together in predetermined positions.

In testimony whereof I have signed my name to this specification in the presence of two subscribing witnesses.

FRANCIS WRIGHT DAVIS.

Witnesses:
R. G. ELSTON,
MARION DE SHAZO.